July 30, 1957 G. B. RUBLE 2,801,284

COMMUNICATION CIRCUIT EMPLOYING GAS TUBES

Filed Aug. 18, 1954 6 Sheets-Sheet 1

INVENTOR
G. B. RUBLE
BY [signature]
ATTORNEY

COMMUNICATION CIRCUIT EMPLOYING GAS TUBES

Filed Aug. 18, 1954 6 Sheets-Sheet 2

INVENTOR
G. B. RUBLE
BY
ATTORNEY

July 30, 1957 G. B. RUBLE 2,801,284

COMMUNICATION CIRCUIT EMPLOYING GAS TUBES

Filed Aug. 18, 1954 6 Sheets-Sheet 3

INVENTOR
G. B. RUBLE
BY
ATTORNEY

INVENTOR
G. B. RUBLE
BY [signature]
ATTORNEY

INVENTOR
G. B. RUBLE
BY
ATTORNEY

July 30, 1957 G. B. RUBLE 2,801,284

COMMUNICATION CIRCUIT EMPLOYING GAS TUBES

Filed Aug. 18, 1954 6 Sheets-Sheet 6

INVENTOR
G. B. RUBLE

BY [signature]

ATTORNEY

United States Patent Office 2,801,284

Patented July 30, 1957

2,801,284

COMMUNICATION CIRCUIT EMPLOYING GAS TUBES

George B. Ruble, Morristown, N. J., assignor to Bell Telephone Laboratories, Incorporated, New York, N. Y., a corporation of New York Application August 18, 1954, Serial No. 450,720

27 Claims. (Cl. 179—18)

This invention relates to communication systems and more particularly to the establishment of interconnections in telephone systems employing gaseous discharge devices.

In telephone systems a number of subscriber subsets may be connected together in a talking path when desired by the subscribers; which subscribers are connected together may be determined by dial pulses initiated by one of the subscribers. The subscriber subsets should be isolated from the possible talking paths and from the control circuitry when not in use and should be connected in a low loss, low impedance private talking path when in use. The connections and controls therefor may be obtained by relays, by relays controlled by gaseous discharge devices, or by talking path gaseous discharge devices of the type disclosed in application Serial No. 169,121, filed June 20, 1950, of M. A. Townsend.

It is a general object of this invention to provide improved communication and telephone systems wherein gaseous discharge devices are broken down to establish the talking path between subscriber stations or subsets.

In specific illustrative embodiments of this invention, a plurality of subscriber subsets are isolated from each other by a pair of talking path gaseous discharge devices both connected to one wire of the subscriber subset. The cathode of the first of these devices is connected to this one wire and the device breaks down and conducts when the subscriber removes his handset from the subset. The anode of the other of these devices is connected to this wire and is broken down under the control of dial pulses from the calling subscriber. Specifically, in accordance with an aspect of this invention, when the one device has broken down, the dial pulses are applied to the transfer cathodes of a gaseous discharge counting or stepping tube, which may be of the type generally disclosed in M. A. Townsend Patent 2,575,370, November 20, 1951, or H. L. von Gugelberg, Patent 2,646,523, July 21, 1953. A resistor is placed across the dial contacts of the subset so that, on dialing, the circuit including the first of the gaseous discharge devices is not broken, which would extinguish conduction in that device, but merely has a resistance added thereto, decreasing the current and thereby applying a negative pulse to a pulse bus connected to the transfer cathodes of the stepping tube.

The discharge present in the stepping tube is stepped along the row of rest cathodes in accordance with the number of dial pulses received until it remains on the rest cathode associated with the called subscriber. The other gaseous discharge devices are connected to the outputs of the rest cathodes of the stepping tube so as to be broken down when the discharge in the stepping tube stops at the rest cathode associated therewith. A low sustain current then flows through the other gaseous discharge device. When the called subscriber removes his handset from the subset a high sustain current flows through this device and the complete talking path is set up.

In circuits in accordance with this invention, the stepping tube discharge is not included in the talking path but is merely part of the control circuit for the establishment of the talking path. Advantageously, the discharge in the stepping tube is initiated, at the start or normal cathode, only when the calling subscriber picks up his telephone and remains at the called rest cathode until the talking path is disestablished.

The gaseous discharge devices may be diodes or may include starter electrodes defining a starter gap, thus being triodes or tetrodes. In the latter case, the rest cathodes of the stepping tube are connected to the starter electrodes.

The telephone system may include only a few subscribers so that only one stage of dialing is needed or a larger number of subscribers so that a number of stages of dialing or a number of alternate control circuits are needed. Thus the rest cathodes of the first stepping tube may be connected to gaseous discharge devices which establish a pulse bus connection to the transfer cathodes of the next stepping tube, when the stepping tubes are connected in tandem for a step-by-step type of operation. Or groups of connecting gaseous discharge devices may be utilized in parallel, each group including its own stepping tube and control circuits therefor. In the latter case, lockout is provided between the various discharge devices of each group and between similarly placed discharge devices in different groups. Also, in accordance with an aspect of one embodiment of this invention, lockout to an occupied subset is assured by applying a negative voltage to the rest cathodes of the various stepping tubes associated with that subset, thereby preventing a discharge being present at one of these rest cathodes while the subset is busy.

It is a feature of this invention that a communication system include a pair of discharge devices for establishing a signaling path between communication stations in that system, one of the discharge devices being connected to the rest cathode of a cold cathode stepping or counting tube so as to be broken down when the discharge in the stepping tube has been stepped, by signal pulses applied thereto from one of the communication stations, to that rest cathode.

It is a further feature of this invention that a telephone system include a subscriber subset and a pair of gaseous discharge devices for defining the talking path for that subset, one of the discharge devices being broken down under control of the subset itself and the other under control of dial pulses applied from the subset to a gaseous discharge stepping tube, to one rest cathode of which the other discharge device is connected.

It is another feature of this invention that a resistance be connected in shunt across the dial contacts of the subscriber subset so that conduction through the first of the gaseous discharge devices is not extinguished on opening of the dial contacts.

It is still another feature of certain embodiments of this invention that the other of the gaseous discharges include a starter electrode, the rest cathode of the stepping or counting tube being connected to the starter electrode. In accordance with this feature of the invention, ringing signals may be applied to the called subset by an oscillating circuit including this discharge device and circuit elements within the subset.

It is a still further feature of this invention that the stepping tube discharge be initiated to the starter or normal cathode only when a subscriber picks up his handset, indicating that he desires to place a call by dialing, and be extinguished only on disestablishment of the talking path on completion of the call. In accordance with this feature of the invention, a start pulse may be applied to the starter gap of a gaseous discharge device in the anode circuit of the stepping tube on initiation of a call to turn the stepping tube on and a stop pulse may be applied to the starter gap of a gaseous discharge device in shunt with the start gaseous discharge device to reduce the anode voltage of the stepping tube sufficiently to turn the stepping tube off on completion of the call.

It is still another feature of one specific embodiment of this invention that a number of control circuits, including groups of pairs of such gaseous discharge devices and a stepping tube individual to each group, be utilized to provide alternate paths between subscriber subsets, lockout being provided to assure that a subset can only be connected to one talking path at a time.

A complete understanding of this invention and of these and other features thereof may be gained from consideration of the following detailed description and the accompanying drawing, in which.

Figure 1:
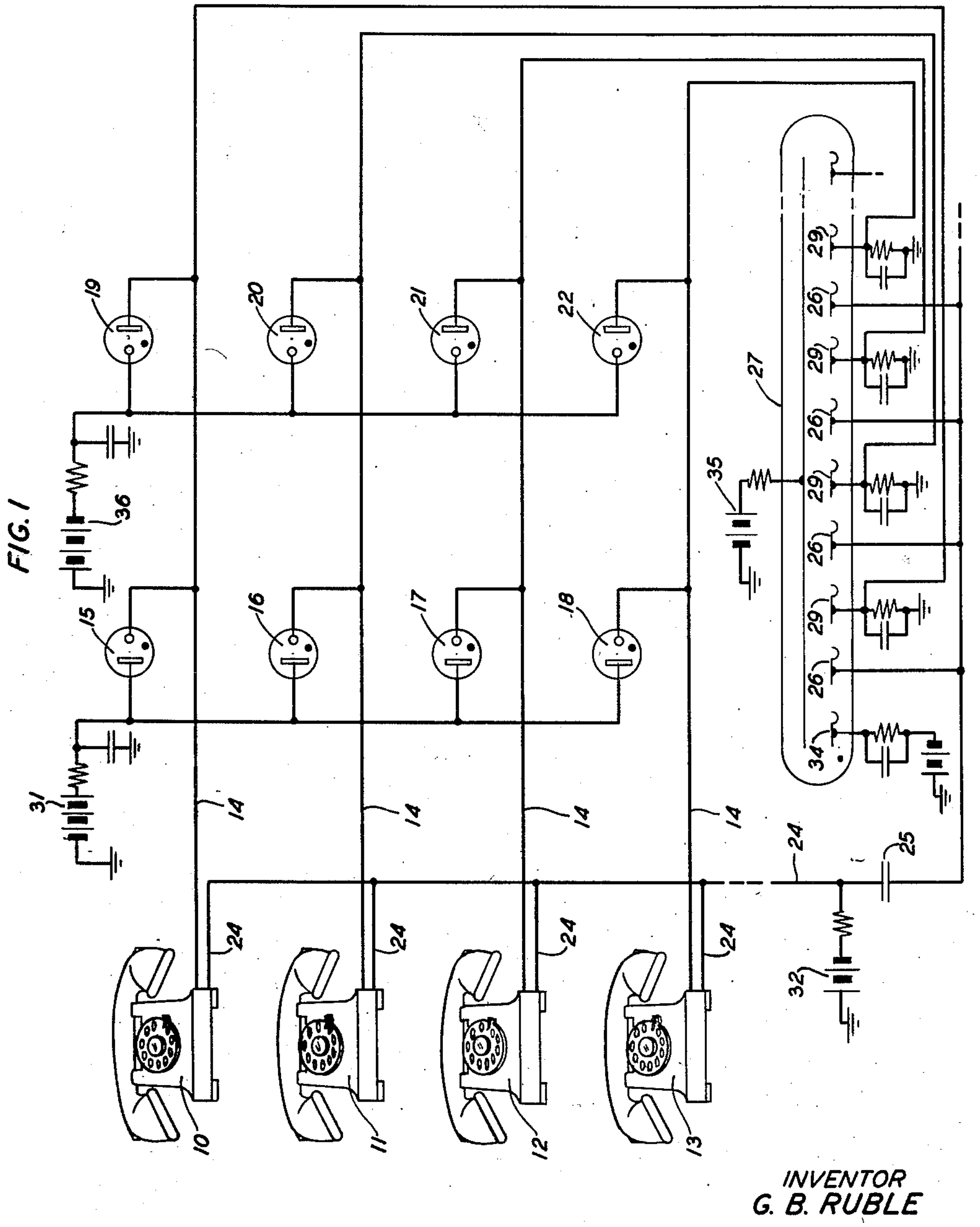
Fig. 1 is a simplified schematic representation of one specific llustrative embodiment of the invention for purposes of the exposition of various of the principles of the invention.

Fig. 1 is a greatly simplified depiction of one specific illustrative embodiment of this invention as a small telephone circuit for purposes of a functional description of certain aspects of this invention. Four subscriber telephones 10, 11, 12, and 13 are shown between which connections are to be made. The telephone subsets may be of usual design except that a resistance is placed across the dial contacts so that opening of the dial contacts does not interrupt the line circuit but adds to it this resistance. One wire from each subset is connected to an upper gaseous discharge device 15, 16, 17, or 18 and also to a lower gaseous discharge device 19, 20, 21, or 22; as can be seen in the drawing, each of the wires 14 is connected to the cathode of diodes 15, 16, 17, or 18 and to the anode of diodes 19, 20, 21, or 22. These diodes serve to isolate each of the subsets from the rest of the switching network and may advantageously be talking path diodes of the type disclosed in application Serial No. 169,121, filed June 20, 1950, of M. A. Townsend.

The other wires 24 of each of the subsets are connected together and, through a coupling capacitor 25, to the transfer cathodes 26 of a gaseous discharge stepping or counting tube 27, which may be of the types generally disclosed in M. A. Townsend Patent 2,575,370, November 20, 1951, and 2,635,810, April 21, 1953, and H. L. von Gugelberg Patent 2,646,523, July 21, 1953. The wires 14 are each connected individually to one of the rest cathodes 29 of the counting tube 27.

To understand the operation of this simplified circuit let us assume that subscriber 13 desires a connection to subscriber 12. When the handset is removed, tube 18 breaks down as a positive potential is applied to its anode from a source 31 and a negative potential, through the subset 13, from source 32. As subscriber 13 desires to be connected to subscriber 12, he dials the digit designation of subscriber 12, which in this instance is three; the digit designations correspond to the number of rest cathodes from the start or normal cathode 34 to the cathode 29 to which the wire 14 of that subscriber's subset is connected. When the dial contacts are opened, on dialing, resistance is added to the circuit already established thereby changing the current flowing and thus the voltage on the common wire 24, which we may refer to as the pulse bus. The voltage pulses are used to step the discharge in counting tube 27 to position three.

The discharge rests on the third rest cathode 29 and an output is applied to the wire 14 of the third subset 12. This causes tube 21 to break down as a circuit is now defined from the stepping tube anode potential source 35, through the stepping tube discharge, wire 14, and tube 21 to a negative potential source 36. Accordingly, tube 21 breaks down and it remains operated with a low sustain current.

When the handset is removed from subset 12 by the subscriber answering his phone, a low impedance path including tubes 21 and 18 is completed and a high sustain current is now passed by tube 21. The complete low impedance talking path has now been established and can be traced from source 31 through tube 18, subset 13, wire 24, subset 12, and tube 21 to source 36. This is a private path since only tubes 18 and 21 can be broken down. For this simplified explanation of this embodiment we may consider that replacing the handsets on the subsets will break the paths used to keep the tubes operated and hence will terminate the conversation and restore the equipment to normal.

From the above simplified description it is apparent that the subscribers are isolated from each other and from switching circuitry by gaseous discharge devices which are broken down, in accordance with pulses applied to a stepping or counter tube, to establish a unique and private connection between two subscribers.

Figure 2:
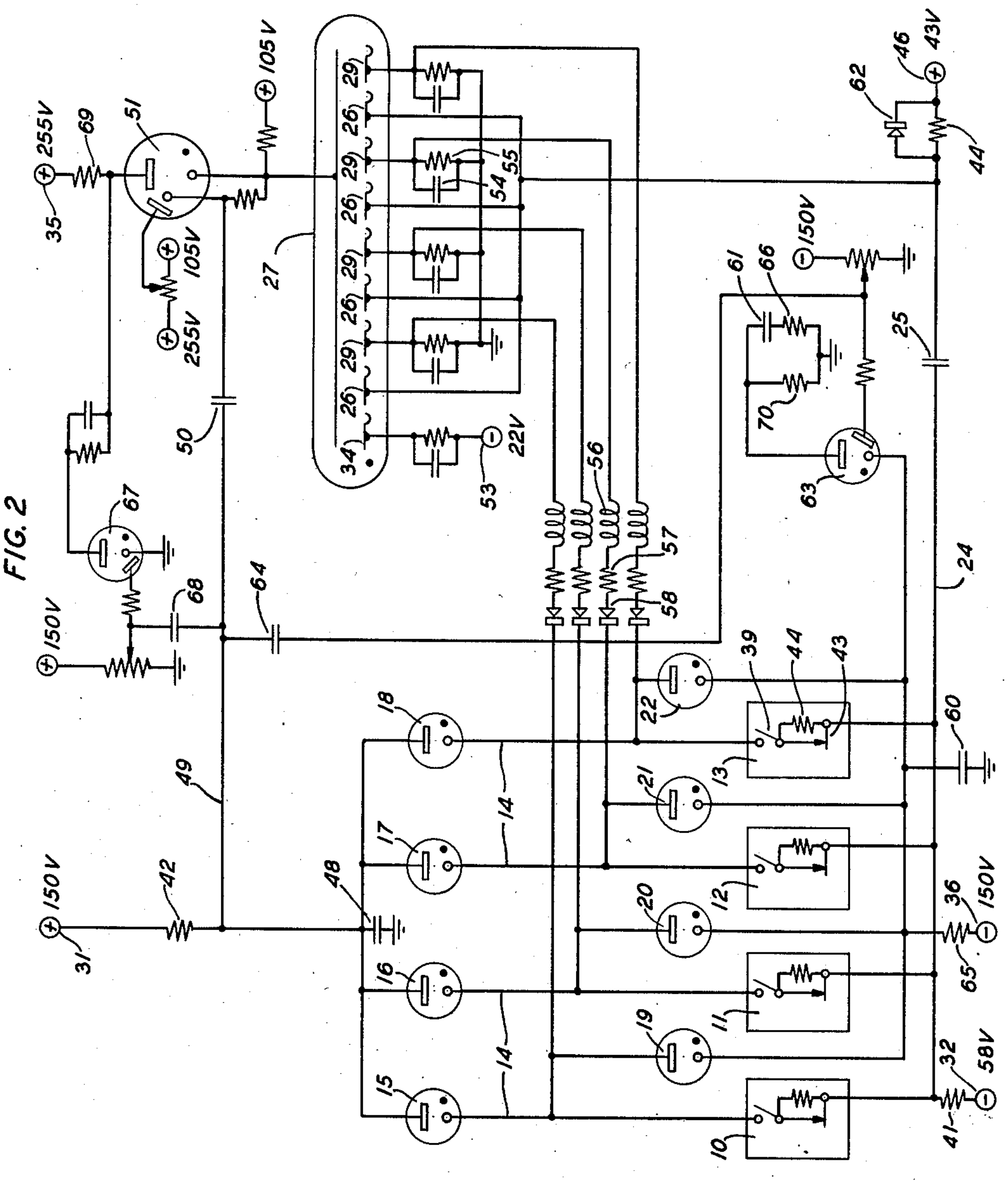
Fig. 2 is a detailed schematic representation of the embodiment of Fig. 1.

We can now turn to Fig. 2 which is a detailed schematic representation of a portion of a telephone switching circuit for interconnecting any two subscribers and particularly for interconnecting any two of the subscribers 10, 11, 12, and 13, depicted in Fig. 1, under the control of the counting tube 27. Again let us consider what happens when a call is made from subscriber 13 to subscriber 12.

When the subscriber 13 removes his handset from the subset the switch 39 is closed applying the voltage from source 32 to the cathode of tube 18 causing that tube to break down and carry a current, which in one specific embodiment was of the order of 60 milliamperes. Because of the current flowing through resistance 41, the voltage on the pulse bus 24 rises from, in one specific illustrative embodiment, −58 volts to about zero. However, since only negative pulses can step the counting tube 27, this voltage rise has no detrimental effect.

If two or more handsets are picked up simultaneously or sequentially, lockout occurs because of resistance 42 connected to the anodes of the diodes 15, 16, 17, and 18; accordingly, only one of these diodes can be sustaining high current flow at any time.

Operation of the dial on subset 13 causes the dial contacts, shown schematically as contacts 43, to break and make. In standard telephone subsets these contacts open for about 50 milliseconds, during which time the resistance 44 is put in series with the line circuit. If no resistance 44 were included in the telephone subset, the opening of the dial contacts 43 would break the circuit causing tube 18 to extinguish and lockout would be lost. With resistance 44 in the circuit, dialing merely changes the current flowing through resistance 41 and hence puts a negative pulse on the pulse bus 24. This pulse is applied through the isolating condenser 25 to the transfer cathodes 26. The isolating condenser 25 allows the transfer cathode 26 to be held at a positive bias by a source 46 without affecting the operation of the various tubes. A positive bias on the cathode 26 is advantageous to assure that stepping will occur only on the presence of a pulse on the pulse bus 24. Resistor 44 provides isolation of the pulses from ground.

Advantageously the stepping tube 27 is only turned on when a call is to be initiated and is turned off on completion of a call; in this manner only signals from the initiating subset can affect the counting tube. When any of tubes 15, 16, 17 or 18 breaks down, as described above, the voltage at the junction of the resistance 42 and a capacitance 48, i. e., at the anodes of these tubes, is decreased. This applies a negative pulse, via lead 49 through an isolating capacitor 50 to the starting cathode of gaseous discharge device 51 having a distinct starter gap; device 51 may be of the type disclosed in V. L. Holdaway Patent 2,518,319, August 8, 1950. Tube 51 is placed in series in the anode circuit of the counting tube 27 so that anode potential from source 35 cannot be applied to the anode of the counting tube until after tube 51 has broken down, on breakdown of its starter gap. When tube 51 has broken down and the anode potential is applied to the counting tube, a discharge occurs between the anode and the starter or normal cathode 34 of the counting tube due to a negative voltage applied to the starter cathode from a source 53. The counter tube is now ready to receive and count the dial pulses from subset 13.

The dial pulses cause the discharge in the counting tube 27 to step to the third rest cathode 29 from the cathode 34 and a positive output voltage is taken across output resistance 55. This positive potential is applied to the anode of tube 21 causing it to break down and sustain a low current, as of the order of 4 milliamperes which flows through the series combination of an inductance 56, a resistance 57, and a varistor or other diode element 58. The discharge in stepping from the normal cathode 34 to the third rest cathode 29 momentarily is present, of course, at the intermediate rest cathodes. The presence of the discharge at these intermediate stepping positions does not cause the tubes 19 and 20, associated therewith, to break down, due to the condenser 54 shunted across each output resistance 55, the time constant of the RC circuit thus defined being longer than the length of the dial pulse so that a sufficient output voltage across the resistor 55 cannot build up during the time the discharge is momentarily present at that rest cathode.

When subscriber 12 removes his handset, after ringing current had been applied thereto to advise him of the incoming call, as is known in the art, the complete talking path including the tubes 18 and 21 is in a high conduction state, with a current of the order of 60 milliamperes in one specific illustrative embodiment, and the two talking path tubes appear as negative resistances in series with a small inductance, as disclosed in the above-mentioned Townsend application. Thus a low impedance talking circuit is established as the tubes passing high current are connected in series with the talking path condensers 48 and 60 and the subsets.

The resistances 57 and inductances 56 are advantageously utilized to assure that, when a talking path has been set up as described above, a third handset cannot detect or recognize the conversation due to possible cross-talk between the two subsets in the talking path and the rest cathodes of the counting tube 27 with sufficient strength to make the conversation intelligible or recognizable.

Advantageously the size of the condenser 48 is such that, on dialing, the voltage across the resistance 42 remains fairly constant so that false breakdown of the tube 22, assuming subset 13 dialing, or of the tubes 15, 16, or 17 due to a positive pulse on decrease of the voltage across resistance 42 does not occur.

Advantageously a varistor or other diode element 62 is connected across the transfer cathode resistance 44. This varistor keeps the large positive pulse that occurs on the handset pickup from appearing on the transfer cathodes 26, where it might delay the time when dialing could commence. Further this varistor serves to keep the direct current level of the transfer cathodes from changing during the dialing operation.

When the call is completed and the talking path circuit is broken by a subscriber returning his handset to its subset, the talking path diodes utilized in that path must be put out. In the talking path circuit traced above, tubes 18 and 21 are conducting. When the talking path is interrupted the connection from the cathode of tube 18 to the negative source 36 is broken. The cathode of tube 18 is, however, also connected to the output resistance 55 of the transfer cathode of the counting tube 27. To prevent this path maintaining the tube 18 in a conduction state, the varistors or diode elements 58 are included in the path and poled so as to prevent flow of current when the cathode of tube 18 is more positive than the voltage across the resistance 55. Accordingly, these diodes 58 serve to put out the talking path diodes 15, 16, 17, and 18 on the interruption of the talking path circuit when a call is completed.

Diodes 58, however, are poled so that the path to the output resistance 55 can maintain tube 21 in a conduction state. Accordingly, talking path diode 21 is advantageously put out by a gas triode 63 used as a shunting switch, the cathode of which is connected to the cathodes of the diodes 19, 20, 21, and 22. Triode 63 may be of the type described in D. S. Peck Patent 2,578,-370, December 11, 1951, or R. L. Vance Patent 2,515,361, July 18, 1950. The starter anode of this put out triode 63 is connected to the anodes of tubes 15, 16, 17, and 18, through an isolating capacitor 64. Thus the appropriate pulses for breakdown of the triode 63 are only applied to the starter gap of triode 63 when the current decreases through both resistance 42 and resistance 65, connected between the source 36 and the cathodes of the tubes 19, 20, 21, 22, and 23. This condition only occurs on interruption of a talking path circuit that had been established. Tube 63 itself ceases to conduct after removal of the initiating pulses as it, together with condensers 60 and 61 and resistance 66, defines a relaxation oscillator circuit which is self-extinguishing. A resistance 70 is advantageously connected between the anode of tube 63 and ground to enable the anode to be properly biased during operation of the tube.

The counter tube 27 is similarly turned off on termination of a talking path connection by a shunt switch tube 67, similar to tube 63, the starter electrode of which is connected, through an isolating capacitor 68, to the anodes of tubes 15, 16, 17, and 18. The anode of tube 67 is connected to the anode potential source 35 of the counter tube and the gas tetrode 51 and in shunt therewith; conduction in the triode 67 increases the current flowing from source 35 through resistance 69 and reduces the potential at the anode of the tetrode 51 below the value required for sustaining a discharge in the tetrode. Extinction of the discharge in the tetrode 51 removes the anode potential from the anode of the counter tube 27, thereby extinguishing the discharge in that tube from the anode to the particular one of the rest cathodes 29 chosen by the dial pulses for that call.

By employing a large condenser 48, as described above, the voltage at the anodes of the tubes 15, 16, 17, and 18 does not change greatly during the dialing process. This assures that the put out triodes, whose starter anodes are connected to these anodes, do not receive erroneous pulses of sufficient magnitude to trigger these triodes.

Figure 3:
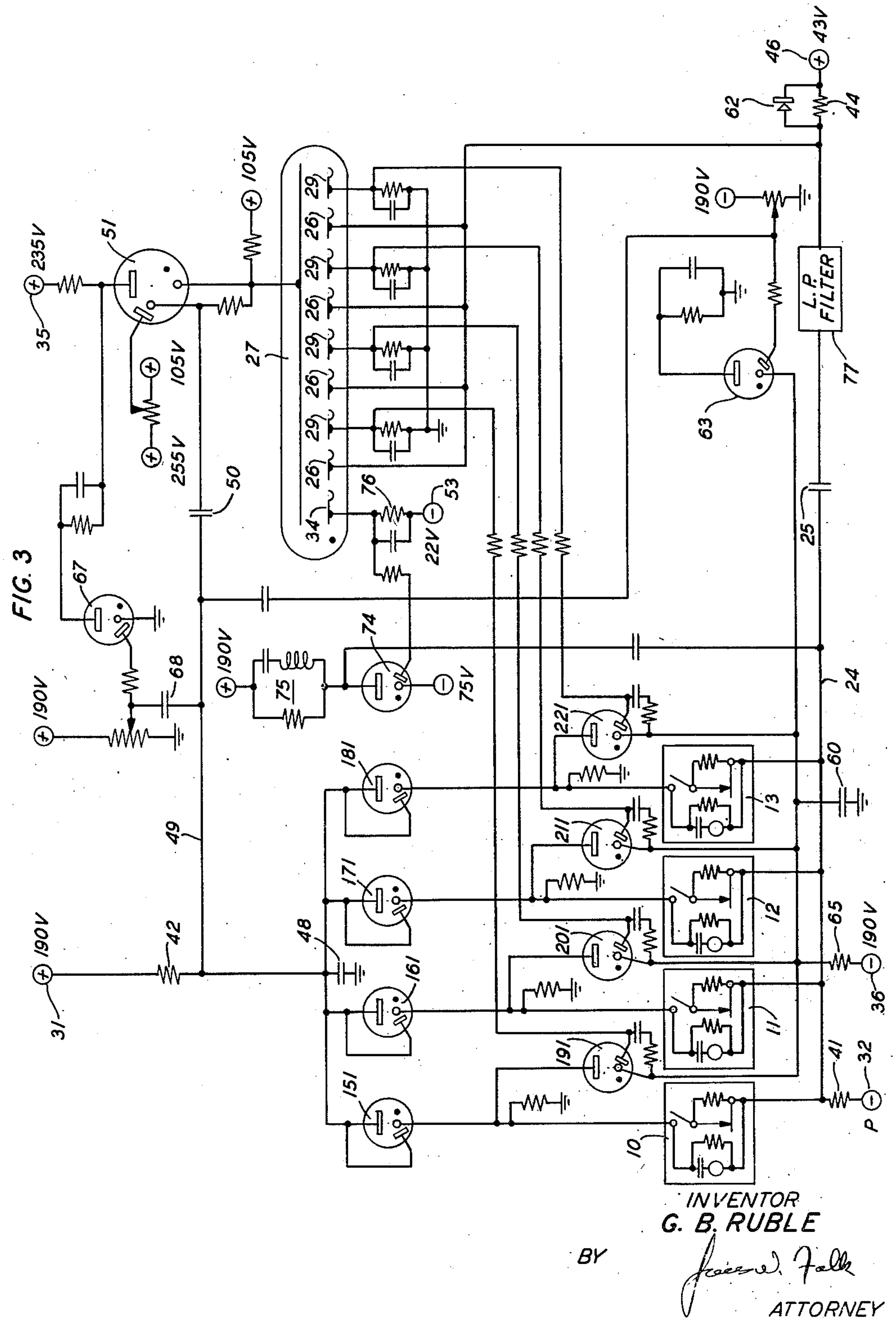
Fig. 3 is a detailed schematic representation of another specific illustrative embodiment of the invention wherein the connecting gaseous discharge devices include starter electrodes.

By replacing the talking path diodes 19, 20, 21, and 22 with triodes whose main gaps are still of a configuration as disclosed in the above-mentioned Townsend application for use as talking path tubes but which utilize a starter electrode to commence conduction in the tube, circuits in accordance with aspects of this invention may be further improved. Fig. 3 depicts a telephone circuit similar to that of Fig. 2 but employing talking path triodes 151, 161, 171, 181, 191, 201, 211, and 221 in place of the talking path diodes 15, 16, 17, 18, 19, 20, 21, and 22. When talking path triodes are employed the connections from the rest cathodes of the counter tube 27 are to the starter anodes of the triodes 191, 201, 211, and 221 so that there is no direct connection from the output of the counter tube to the talking path set up by the triodes; accordingly, the discharges present in talking path tubes 191, 201, 211 and 221 are extinguished when the talking path is interrupted and the varistors 58, employed in the embodiment of Fig. 2, are not requisite. Additionally, all possibility of cross-talk through the counting tube is of course eliminated.

When talking path triodes are employed in circuits in accordance with this invention, signaling of a subscriber may advantageously be attained by utilizing the triodes 191, 201, 211, and 221 as triode oscillators. Such a combination is depicted in the embodiment of Fig. 3 and, so that it may more readily be considered apart from the other elements of the circuit, in the schematic of Fig. 4. As can be seen best in Fig. 4, when the counting discharge has been stepped to a particular rest cathode 29 causing the talking path triode 211 to break down, a circuit is established from ground and condenser 69 through the tube 211, the ring armature receiver 71, and condenser 72 of the subset of subscriber 12 to the pulse bus 24 and thence through the subset and conducting talking path triode of the calling subscriber, as described above with relation to the talking path. Due to the characteristics of the ring armature receiver 71 and the series capacitor 72 associated therewith, an oscillator circuit is established causing current to flow through the ring armature receiver 71 of sufficient magnitude and frequency for signaling purposes. When the subscriber 12 answers the telephone by removing his handset from the subset the switch 39 is closed and the ringing circuit shorted out. Similarly if the calling subscriber hangs up before the called subscriber answers, the circuit through the calling subscriber's subset is interrupted extinguishing his talking path triode which in turn extinguishes the discharge in the stepping tube, as described above, thereby removing the triggering voltage from the starter electrode of the talking path triode of the called subscriber and the ringing ceases.

Dial tone may be provided, if desired, by another gaseous triode 74 to the anode of which is connected an oscillatory circuit 75 which may advantageously oscillate at about 1200 cycles. Circuit 75 is advantageously a relaxation oscillator triggered by the presence of starter gap current. The starter anode of triode 74 is connected across the output resistance 76 connected to the start or normal cathode 34 of the counter tube 27, so that a discharge in tube 74 and therefore oscillation commence when counter tube 27 is turned on by a subscriber removing his handset from the subset. Conduction in tube 74 is extinguished by the first negative dial pulse applied to pulse bus 24 and the removal of the starter gap current on transfer of the discharge from the normal cathode 34. A low pass filter 77 is advantageously connected in the pulse bus 24 to prevent the high frequency oscillations from the oscillator 75 appearing at the transfer cathodes 26. If counter 27, and thus the control circuitry, are occupied on a priorly set up call, no dial tone would be supplied to the calling subscriber.

Figure 4:
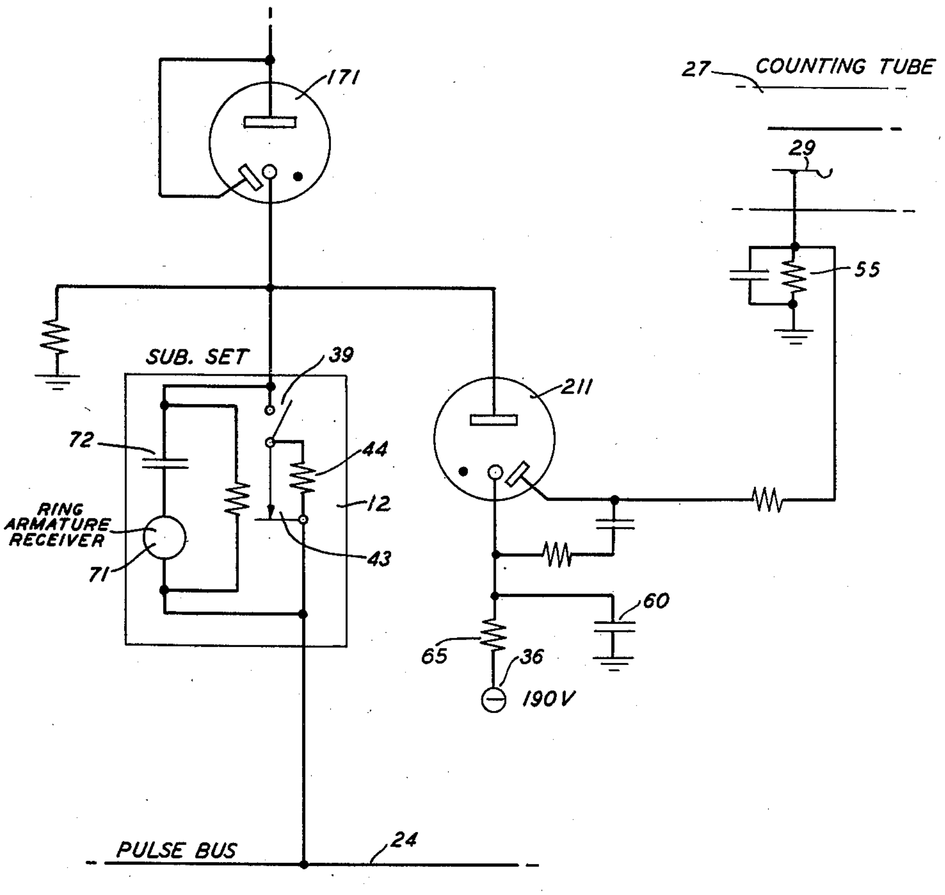
Fig. 4 is an enlarged schematic representation of the portion of the embodiment of Fig. 3 relating to the application of ringing signals to the subscriber subsets.

In the embodiments of Figs. 2 and 4 only a single counting tube has been utilized to control the connection between two subscriber stations. It is to be understood, however, that the principles of this invention are applicable to larger telephone systems wherein a number of such counter tubes may be utilized either alternatively to establish connections between subscribers or in tandem or step-by-step relationship whereby each tube counts a single digit of a multidigit called number. In the latter case the output connections from the output resistances of the rest cathodes would establish pulsing connections to the transfer cathodes of subsequent counter tubes. Thus it is to be understood that the connection being set up may, in accordance with this invention, be between a subscriber and a talking trunk to a distant telephone office rather than between two subscribers directly, as has been described and explained herein for purposes of exposition of the invention.

Figure 5A:
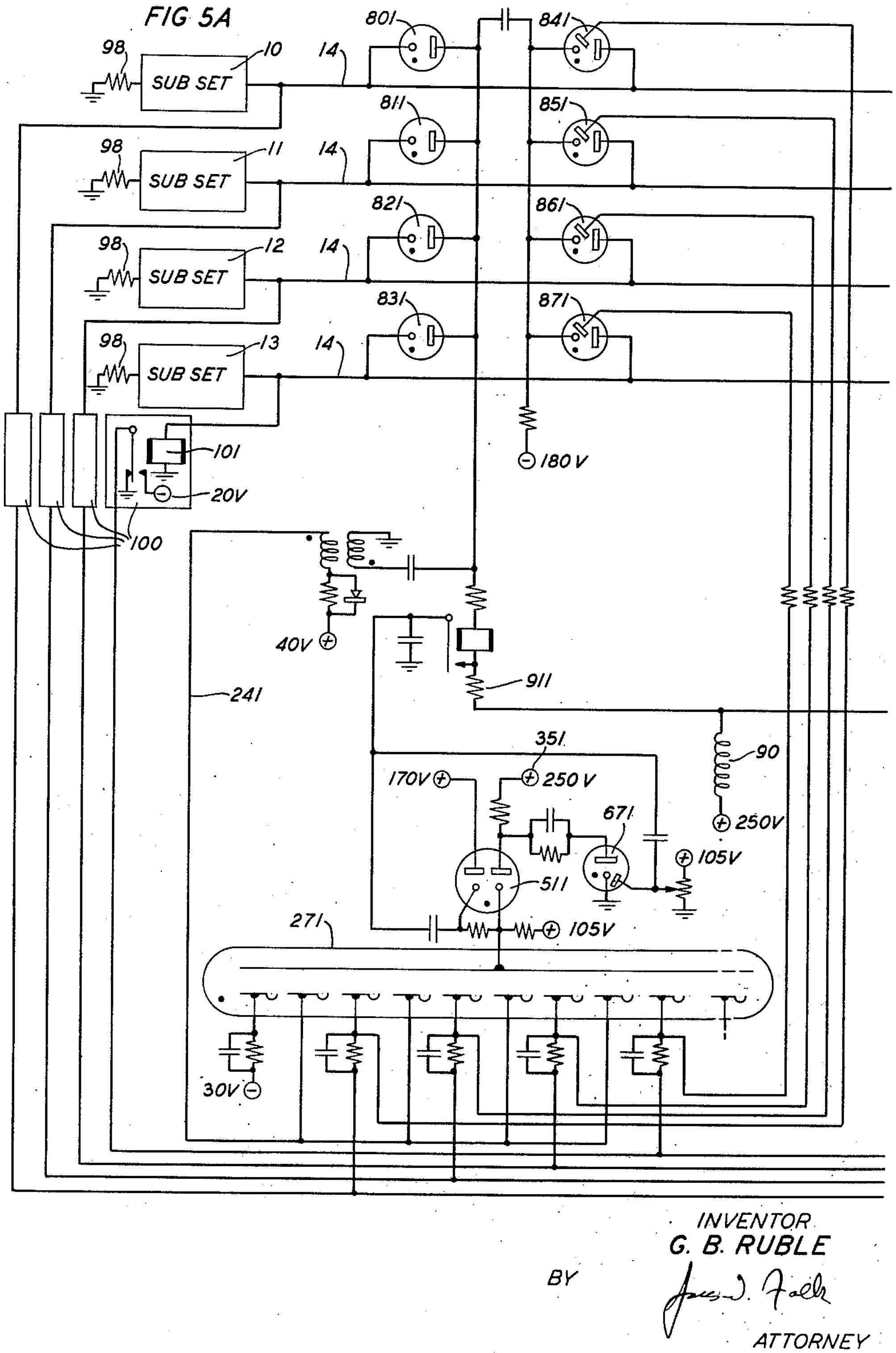
Figs. 5A and 5B are a schematic representation of another specific illustrative embodiment of this invention wherein a number of groups of connecting gaseous discharge devices and control circuits therefor are connected in parallel.
Figure 5B:
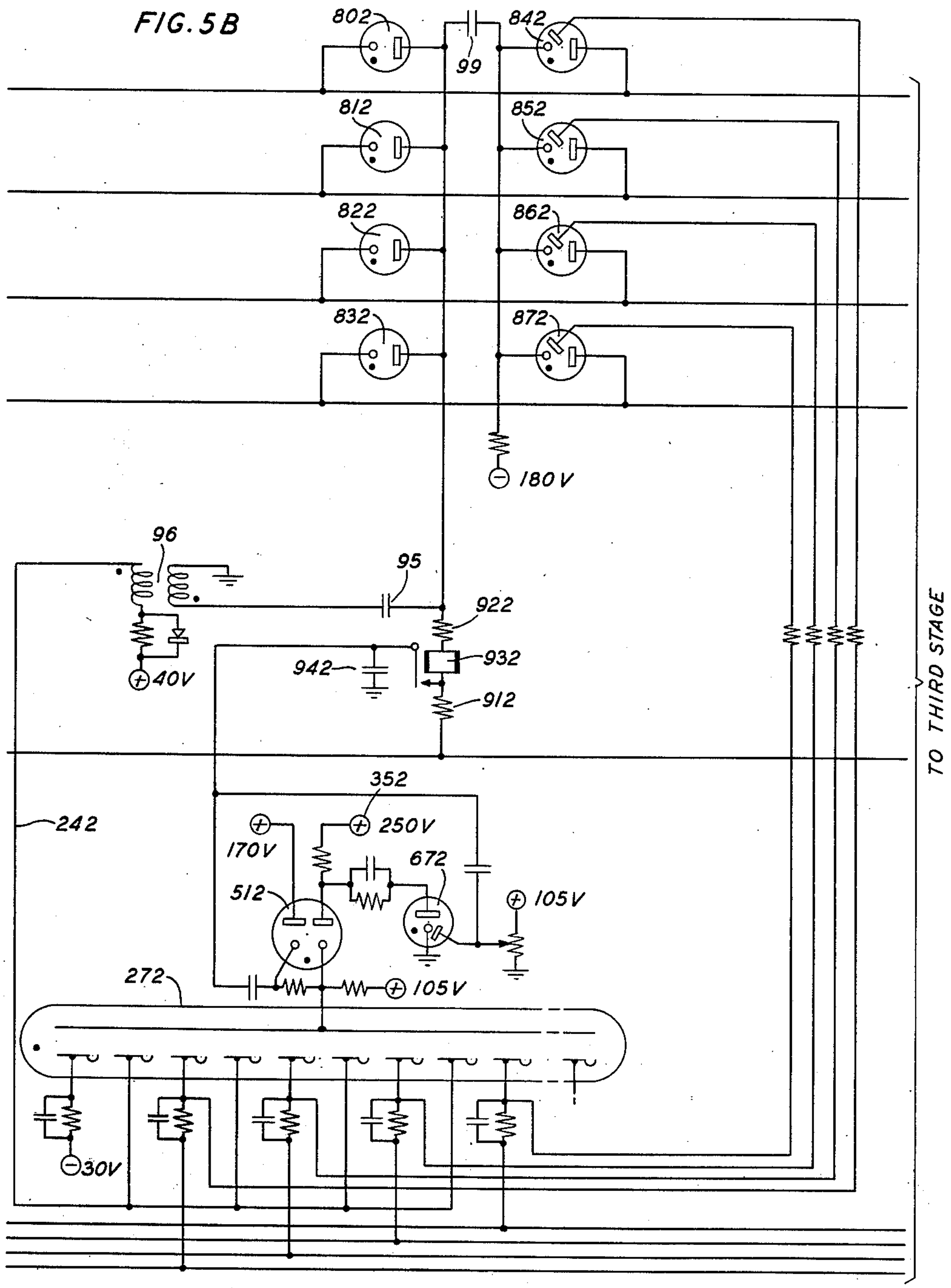

In Figs. 5A and 5B is shown another specific embodiment of the invention wherein subscribers may be connected by control signals from one of a number of counter tubes controlling different groups of talking path tubes. In this embodiment tubes 801, 811, 821, and 831, in the first group, and tubes 802, 812, 822, and 832, in the second group, correspond to the tubes 15, 16, 17, and 18 having their cathodes connected to the one wire 14 from the subscriber subsets 10, 11, 12, and 13 and the tubes 841, 851, 861, and 871, in the first group, and tubes 842, 852, 862, and 872, in the second group correspond to the talking path tubes 19, 20, 21, and 22 having their anodes connected to the one wire 14. As can be seen, the tubes 801, 811, 821, 831, etc., may be diodes while the tubes 841, 851, 861, 871, etc., are advantageously triodes.

Each group of tubes has associated with it a counter tube 27 and circuitry associated therewith; where that circuitry includes elements basically common to this embodiment and the prior embodiments, except, perhaps, for numerical values or sizes, the element is designated by the same reference numeral with the addition of a "1" or "2" depending on whether it is associated with the first or second group.

The operation of this embodiment and the various aspects thereof can be understood from a description of a connection between the fourth and third subscribers 13 and 12, respectively, assuming the first and second subscribers 10 and 11, respectively, priorly connected together. In this specific embodiment of this invention, as many simultaneous conversations can be provided as desired by the addition of stages or groups of talking path tubes and counter tubes. Let us assume that the connection priorly set up utilizes talking path tubes in the first group of tubes.

When subscriber 13 picks up his handset from the subset normally either tube 831 or 832, assuming only two groups of tubes, would break down. Only one of these would break down because of the inductance 90 in the common anode circuit. However, as tube 801 or 811 is conducting, on the priorly established call, the potential drop across resistance 911 is such that all the first stage tubes are locked out and tube 831 cannot break down.

The breakdown of tube 832 causes current to flow through resistances 922 and 912, closing the contacts of relay 932 and causing a voltage charge to develop across condenser 942. This charge is used to turn on the counting tube, by means of the tetrode 512, as described above with reference to the prior embodiments. When the subscriber 13 dials, the current flowing through tube 832 is changed, due to the addition in the circuit of the resistance across the dialing contacts, as described above, and the voltage across resistance 922 is also changed. The potential at the lower end of the resistance 922 is held substantially constant by the large condenser 942. This positive pulse developed by the change in voltage across resistance 922 is applied, through an isolating condenser 95 to a polarity reversing circuit 96 so that a negative dial pulse is applied to the pulse bus 242 and thence to the transfer cathodes of the counter tube 272 of that stage.

When the counter tube has stepped to the appropriate rest cathode 29 corresponding to the number dialed, and if the called subset is not in use on a prior call, then an output signal is taken across the output resistance of that rest cathode of the counter tube to the starter anode of the appropriate talking path triode, which, in the call under discussion we have assumed to be the triode 862. Triode 862 thus breaks down and a low sustain current flows through the starter gap. The triode 862 may be employed, together with the ringer circuitry of the subset, as an oscillator to generate the ringing signal, as described above and depicted in Fig. 4.

When the called subscriber 12 removes his handset from the subset, the main gap of tube 862 now goes into it high current conduction state and the oscillation stops. Conversation can now occur over the talking path from ground, through a low value resistance 98 associated with the subset, for reasons described below, the subset 13, tube 832, a talking path capacitor 99, tube 862, subset 12, and resistance 98 to ground. This is a private, low noise, low loss path.

When a call is completed, replacing the handset on the subset causes the voltage to rise on condenser 942 and the put out triode 672 to be fired, as described above. This puts out the discharge in the counter tube 272.

If the calling party tries to get a connection to a subscriber already busy on a priorly set up talking path, lockout is provided to assure that no double connections can be made. This is accomplished in this specific embodiment of the invention by reducing the output potentials of the rest cathodes of all the counter tubes 27 for the subsets that are busy. A 20 volt drop may be provided by a sensing device which operates on low positive or negative signals, as of the order of ±5 volts due to current flow through resistance 98, depending on whether the subscriber is initiating or receiving a call. In the embodiment depicted in Fig. 5, the sensing device 100 includes a relay 101 whose armature is switched from a ground contact to a −20 volt contact when the subset is in use. A sensing device 100 is applied to each subset, operates quickly but is slow to release to be sure to provide the desired protection. Other sensing devices, employing gaseous discharge devices and diode gates or other elements, will be apparent to those skilled in the art.

As discussed before, the outputs of the counter tube rest cathodes may advantageously be employed to connect the talking buses to additional groups of counter tube and talking path tube stages in embodiments of this invention wherein it is desired to connect subscribers together or a subscriber to an outgoing trunk on the basis of a multidigit number dialed by the subscriber.

It is to be understood that the above-described arrangements are illustrative of the application of the principles of the invention. Numerous other arrangements may be devised by those skilled in the art without departing from the spirit and scope of the invention.

What is claimed is:

1. In a communication circuit, a communication station, means defining a signaling path for said station, said means including a pair of gaseous discharge devices, and means for establishing conduction in one of said gaseous discharge devices to establish said path in response to signal pulses, said last mentioned means including a gaseous discharge counter tube having alternate rest and transfer cathodes, means applying said signal pulses to said transfer cathodes, and means connecting said one device to one of said rest cathodes.

2. In a telephone circuit, a subscriber subset, means defining a talking path for said subset, said means including a gaseous discharge device, and means for establishing conduction in said gaseous discharge device to establish said path in response to dial pulses from said subset, said last mentioned means including a gaseous discharge counter tube having alternate rest and transfer cathodes, means for applying said dial pulses to said transfer cathodes, and means for applying a conduction establishing voltage to said device when the discharge in said tube is stepped by said dial pulses to a particular one of said rest cathodes.

3. In a telephone circuit in accordance with claim 2, said means for applying said dial pulses to said transfer cathodes including dial contacts in said subset and a resistance in shunt across said contacts.

4. In a telephone circuit, a subscriber subset, means defining a talking path for said subset, said means including a gaseous discharge device having main gap defining electrodes and a starter electrode, and means for establishing conduction in said gaseous discharge device to establish said path in response to dial pulses from said subset, said last mentioned means including a gaseous discharge counter tube having alternate rest and transfer cathodes, means for applying said dial pulses to said transfer cathodes, and means for applying a conduction establishing voltage to said starter electrode when the discharge in said tube is stepped by said dial pulses to a particular one of said rest cathodes.

5. In a telephone circuit in accordance with claim 4, means including said gaseous discharge device for applying signals to said subset.

6. In a telephone circuit, a subscriber subset, means defining a talking path for said subset, said means including a gaseous discharge device, means for establishing conduction in said gaseous discharge device in response to dial pulses from said subset, said last mentioned means including a gaseous discharge counter tube having alternate rest and transfer cathodes, means for applying said dial pulses to said transfer cathodes, and means connecting said device to one of said rest cathodes, and means for initiating a discharge in said tube to a start rest cathode when the subscriber picks up said subset, said initiating means including a turn-on gaseous discharge device connected to the anode of said counter tube and having means defining a starter gap and means for applying a pulse from said subset to said starter gap to break down said gap when the subscriber picks up said subset.

7. In a telephone circuit in accordance with claim 6, means for extinguishing conduction in said counter tube to said one rest cathode on disestablishment of said talking path, said means including a turn-off gaseous discharge device having its anode connected to the anode of said turn-on discharge device and including a starter gap and means for applying a pulse to said starter gap to establish conduction in said turn-off discharge device on disestablishment of said talking path, said turn-off discharge device being in shunt with said turn-on discharge device to reduce the voltage on the anode of said turn-on discharge device below that necessary to sustain conduction, whereby conduction in both said turn-on discharge device and said counter tube is extinguished.

8. In a telephone circuit, a plurality of subscriber subsets, means defining talking paths for said subsets, said means including gaseous discharge devices, and means for establishing conduction in one of said gaseous discharge devices to establish a talking path including a particular one of said subsets in response to dial pulses from said particular subset, said last mentioned means including a gaseous discharge counter tube having alternate rest and transfer cathodes, means for applying dial pulses to said transfer cathodes on dialing of any one of said subsets, and means connecting said devices individually to said rest cathodes.

9. In a telephone circuit, a plurality of subscriber subsets, means defining talking paths for said subsets, said means including groups of gaseous discharge devices, and means for establishing conduction in one gaseous discharge device in one of said groups to establish a talking path to a particular one of said subsets in response to dial pulses from said particular subset, said last mentioned means including a gaseous discharge counter tube associated with each of said groups of discharge devices, said tubes each having alternate rest and transfer cathodes, means for applying dial pulses to said transfer cathodes of one counter tube on dialing of any one of said subsets, and means connecting said devices of each group individually to the rest cathodes of the counter tube associated with said group of devices.

10. In a telephone circuit in accordance with claim 9, lockout means for preventing conduction of devices defining more than one path in a single group and for preventing conduction of similarly connected devices in different groups on pick up of a subset by a subscriber.

11. In a telephone circuit in accordance with claim 10, means for preventing establishment of a talking path to a subset occupied on a prior call, said means including means for preventing a discharge appearing at the rest cathodes of said counter tubes associated with said subset.

12. In a telephone circuit in accordance with claim 9, said gaseous discharge devices connected to said rest cathodes including means defining a starter gap and said last mentioned means being connected to said rest cathodes.

13. A telephone circuit comprising a plurality of subscriber subsets, a plurality of gaseous discharge devices for interconnecting any of said subscriber subsets, and means for establishing conduction in specific ones of said devices to connect particular subsets in response to dial pulses from one of said particular subsets, said means including a gaseous discharge stepping tube having a plurality of cathodes, means for applying said dial pulses to said stepping tube to cause a discharge to step along said plurality of cathodes, and means connecting said cathodes to particular ones of said gaseous discharge devices.

14. A telephone circuit comprising a plurality of subscriber subsets, means for defining talking paths between said subsets, said means including a plurality of gaseous discharge devices and each talking path thus defined including a pair of said devices, means for establishing conduction in one of said pair of devices on pickup of a subset by a subscriber, and means for establishing conduction in the other of said pair of devices in response to dial pulses from said subset, said last mentioned means including a gaseous discharge stepping tube having a plurality of alternate rest and transfer cathodes, means for applying said dial pulses to said transfer cathodes, and means connecting said other device to a particular one of said rest cathodes.

15. A telephone circuit in accordance with claim 14 wherein said talking path thus defined includes a first source of potential, said one device, the two subscriber subsets interconnected by said path, said other device, and a second source of potential.

16. A telephone circuit in accordance with claim 14 wherein said talking path thus defined includes one of said subscriber subsets, said one device, said other device, a capacitor between said pair of devices, and the other of said subscriber subsets.

17. A telephone circuit in accordance with claim 14 wherein said other devices include means defining a starter gap and said rest cathodes of said stepping tube are connected to said means defining said starter gaps.

18. A telephone circuit in accordance with claim 17 including means for applying signals to said subsets, said signal means for each subset including one of said other devices.

19. A telephone circuit in accordance with claim 14 wherein said means for applying said dial pulses to said transfer cathodes includes dial contacts in said subsets and a resistance in shunt across said dial contacts.

20. A telephone circuit in accordance with claim 14 including means for initiating a discharge to a normal cathode in said stepping tube when the subscriber picks up his subset and means for extinguishing said discharge to said rest cathode in said stepping tube on disestablishment of said talking path.

21. A telephone circuit in accordance with claim 20 wherein said initiating means includes a gaseous discharge device connected to the anode of said stepping tube and having a starter gap connected to said ones of said pairs of devices and said extinguishing means includes a gaseous dicharge device shunting said initiating discharge device and also having a starter gap connected to said ones of said pairs of devices.

22. A telephone circuit in accordance with claim 14 wherein said plurality of gaseous discharge devices are arranged in groups, the others of said pairs of devices of each group including means defining a starter gap, and a gaseous discharge stepping tube is associated with each of said groups of discharge devices.

23. A telephone circuit in accordance with claim 22 wherein said dial pulses are applied to the transfer cathodes of one of said stepping tubes through said one device of said groups.

24. A telephone circuit in accordance with claim 23 including means for preventing establishment of a talking path to a subset priorly occupied on a prior call, said means including means for preventing a discharge appearing at the rest cathodes of said counter tubes associated with said subset.

25. A telephone circuit comprising a plurality of subscriber sets, means for defining talking paths to said subscriber sets, said means including a pair of gaseous discharge devices associated with each of said subsets, the cathode of the first of said devices being connected to one wire of said subset and the anode of the other of said devices being connected to said one wire, and means for establishing conduction in one of said first devices and one of said other devices to establish said talking path.

26. A telephone circuit in accordance with claim 25 wherein said means for establishing conduction in said devices includes means for establishing conduction in one of said first devices on pickup of the subset associated therewith by the subscriber and means for establishing conduction in the other of said devices in response to dial pulses from said subset.

27. A telephone circuit in accordance with claim 26 wherein said means for establishing conduction in the other of said devices includes a gaseous discharge stepping tube having alternate rest and transfer cathodes, means for applying said dial pulses to said transfer cathodes, and means connecting the other of said devices to one of said rest cathodes.

No references cited.